United States Patent
Lee et al.

(10) Patent No.: US 9,580,102 B2
(45) Date of Patent: Feb. 28, 2017

(54) DEVICE AND METHOD FOR COMPENSATING FRICTION OF A MOTOR DRIVEN POWER STEERING SYSTEM

(71) Applicant: HYUNDAI MOBIS CO., LTD., Seoul (KR)

(72) Inventors: Pil Woo Lee, Yongin-si (KR); Eun Kyung Gu, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 82 days.

(21) Appl. No.: 14/628,065

(22) Filed: Feb. 20, 2015

(65) Prior Publication Data

US 2015/0344065 A1 Dec. 3, 2015

(30) Foreign Application Priority Data

May 28, 2014 (KR) .......................... 10-2014-0064551

(51) Int. Cl.
  *B62D 5/04* (2006.01)
  *B62D 6/10* (2006.01)
(52) U.S. Cl.
  CPC ......... *B62D 5/0463* (2013.01); *B62D 5/0481* (2013.01); *B62D 6/10* (2013.01)
(58) Field of Classification Search
  CPC ....... B62D 5/0463; B62D 5/0481; B62D 6/10
  See application file for complete search history.

(56) References Cited

U.S. PATENT DOCUMENTS

| | | | |
|---|---|---|---|
| 6,250,419 B1 * | 6/2001 | Chabaan | B62D 5/0463 180/443 |
| 6,293,366 B1 * | 9/2001 | Chabaan | B62D 6/10 180/443 |
| 2003/0051560 A1 * | 3/2003 | Ono | G01N 19/02 73/862.08 |

(Continued)

FOREIGN PATENT DOCUMENTS

| | | |
|---|---|---|
| KR | 10-2010-0056312 A | 5/2010 |
| KR | 10-2012-0053300 A | 5/2012 |
| KR | 10-2014-0014775 A | 2/2014 |

OTHER PUBLICATIONS

Office Action dated Apr. 20, 2015 of corresponding Korean Patent Application No. 10-2014-0064551—4 pages.

*Primary Examiner* — Ian Jen
(74) *Attorney, Agent, or Firm* — Knobbe Martens Olson & Bear LLP

(57) ABSTRACT

A device for compensating friction of a motor driven power steering system, comprising a sensing unit for sensing at least one of a steering angle, an angular speed and a vehicle speed, and a steering torque corresponding to the at least one of the steering angle, the angular speed and the vehicle speed; and a control unit for storing the steering torques sensed through the sensing unit in a storage unit when the at least one of the steering angle, the angular speed and the vehicle speed sensed through the sensing unit falls into the respective setting range. The control unit calculates an average value of the stored steering torques when the number of steering torques stored in the storage unit is equal to or higher than a reference number, and computes a friction-compensating torque based on a result obtained by comparing the average value with a reference value.

10 Claims, 2 Drawing Sheets

(56) References Cited

U.S. PATENT DOCUMENTS

| | | | | |
|---|---|---|---|---|
| 2003/0079933 | A1* | 5/2003 | Chabaan | B62D 5/0463 180/446 |
| 2004/0138797 | A1* | 7/2004 | Yao | B62D 5/0463 701/44 |
| 2008/0047775 | A1* | 2/2008 | Yamazaki | B62D 5/0463 180/443 |
| 2012/0232759 | A1* | 9/2012 | Oniwa | B62D 5/0463 701/41 |
| 2013/0030654 | A1* | 1/2013 | Oblizajek | B62D 6/008 701/42 |

\* cited by examiner

DEVICE AND METHOD FOR COMPENSATING FRICTION OF A MOTOR DRIVEN POWER STEERING SYSTEM

CROSS-REFERENCES TO RELATED APPLICATIONS

The present application claims priority to Korean application number 10-2014-0064551, filed on May 28, 2014, which is incorporated by reference in its entirety.

BACKGROUND

1. Field

The present disclosure relates to a motor driven power steering system of a vehicle, and more particularly to a device and method for compensating friction of a motor driven power steering system.

2. Description of Related Art

A power steering system for a vehicle serves as a steering system for providing a power to aid a driver's manipulation to a steering wheel of a vehicle. As such a power steering system, a type of power steering system that uses a hydraulic pressure has been widely used, but recently a type of Motor Driven Power Steering (MDPS) system using an electric motor is increasingly used. The MDPS system has the advantages that it is light weight, has less occupied space and dispenses with oil exchanges, compared to a conventional hydraulic type power steering system.

Korean Patent Laid-open Publication No. 10-2010-0056312 published on May 27, 2010 and entitled "Method for compensating steering of motor drive power steering system" discloses a motor drive power steering system.

SUMMARY

In view of the above, embodiments of the present invention have been made to solve the problems of the above-mentioned conventional MDPS system, and thus embodiments of the present invention are directed to a device and method for compensating friction of a motor driven power steering system so that a driver can feel continuously a level of steering feelings equivalent to that of steering feelings felt when the vehicle was released initially, even after the aging of the vehicle has been progressed.

A device for compensating friction of a motor driven power steering system according to an embodiment of the present invention may include a sensing unit for sensing at least one of a steering angle, an angular speed and a vehicle speed, and a steering torque corresponding to at least one of the steering angle, the angular speed and the vehicle speed; a storage unit for storing the steering torques sensed through the sensing unit; and a control unit for storing the steering torques sensed through the sensing unit in the storage unit when the at least one of the steering angle, the angular speed and the vehicle speed sensed through the sensing unit falls into the respective setting range, wherein the control unit may calculate an average value of the stored steering torques when the number of steering torques stored in the storage unit is equal to or higher than a reference number, and compute a friction-compensating torque based on a result obtained by comparing the average value with a reference value.

According to another embodiment, upon computing the friction-compensating torque, the control unit may calculate a friction-heuristically-compensating torque based on the result obtained by comparing the average value with the reference value, and compute the friction-compensating torque by adding the heuristically-compensating torque to a predetermined friction-basically-compensating torque.

According to another embodiment, the friction-heuristically-compensating torque may correspond to $$\frac{\text{average value} - \text{reference value}}{\text{reference value}} \times \text{constant value}$$

and the control unit may determine the constant value by referring to the friction-basically-compensating torque.

According to another embodiment, the control unit may store in the storage unit at least one of a steering torque when a driver rotates the steering wheel from on-center in a clockwise direction and a steering torque when the driver rotates the steering wheel from on-center in a counterclockwise direction.

According to another embodiment, the control unit may store in the storage unit at least one of a steering torque when the steering wheel starts to be reversed by a driver and a steering torque when the steering wheel starts to be moved normally after reversing.

According to another embodiment, the control unit may store in the storage unit the steering torques sensed through the sensing unit when all of the steering angle, the angular speed and the vehicle speed sensed through the sensing unit fall into the ranges defined in any set of a plurality of setting range sets, and the setting range set may be a set of a setting range of the steering angle, a setting range of the angular speed and a setting range of the vehicle speed to be fallen into at the same time so as to store the sensed steering torques in the storage unit.

A method for compensating friction of a motor driven power steering system according to another embodiment of the present invention may include sensing at least one of a steering angle, an angular speed and a vehicle speed, and a steering torque corresponding to the at least one of the steering angle, the angular speed and the vehicle speed, through a sensing unit under control of a control unit; storing in the storage unit the steering torques sensed through the sensing unit under control of the control unit, when the at least one of the steering angle, angular speed and vehicle speed sensed through the sensing unit falls into the respective setting range; calculating, by the control unit, an average value of the stored steering torques when the number of steering torques stored in the storage unit is equal to or higher than a reference number; and computing, by the control unit, the friction-compensating torque based on a result obtained by comparing the calculated average value and a reference value.

According to another embodiment, computing the friction-compensating torque may include calculating, by the control unit, a friction-heuristically-compensating torque based on the result obtained by comparing the calculated average value and the reference value; and computing, by the control unit, the friction-compensating torque by adding the calculated heuristically-compensating torque to a predetermined friction-basically-compensating torque.

According to another embodiment, calculating the friction-heuristically-compensating torque may include determining, by the control unit, a friction-heuristically-compensating constant value by referring to the friction-basically-compensating torque, and the friction-heuristically-compensating torque may correspond to $$\frac{\text{average value} - \text{reference value}}{\text{reference value}} \times \text{the constant value}$$

According to another embodiment, in storing the steering torques in the storage unit, the control unit may store in the storage unit at least one of a steering torque when a driver rotates the steering wheel from on-center in a clockwise direction and a steering torque when the driver rotates the steering wheel from on-center in a counterclockwise direction.

According to another embodiment, in storing the steering torques in the storage unit, the control unit may store in the storage unit at least one of a steering torque when the steering wheel starts to be reversed by a driver and a steering torque when the steering wheel starts to be normally moved after starting to reverse.

According to another embodiment, in storing in the storage unit the steering torques sensed through the sensing unit, the control unit may store the sensed steering torques in the storage unit when all of the steering angle, the angular speed and the vehicle speed sensed through the sensing unit fall into the ranges defined in any set of a plurality of the setting range sets. Here, the setting range set may be a set of a setting range of the steering angle, a setting range of the angular speed and a setting range of the vehicle speed to be fallen into at the same time so as to store the sensed steering torques in the storage unit.

The device and method for compensating friction of a motor driven power steering system according to embodiments of the present invention have the advantages that a driver can feel continuously a level of steering feelings equivalent to that of steering feelings when a vehicle was released initially, by continuously monitoring friction of the mechanical portion in the MDPS assembly, tracking the change amount of friction, and then computing a torque to compensate the friction decreased, even after the friction of the mechanical portion due to aging of the vehicle has been decreased.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of embodiments of the invention into account and can be changed according to the custom or intention of users or operators. Therefore, definition of the terms should be made according to the overall disclosures set forth herein.

Generally, an MDPS system uses an auxiliary power source to provide a portion of steering torque to be applied a force necessary for steering a steering wheel by a driver, thereby allowing the driver to readily steer the steering wheel upon steering a vehicle. That is, a driver's steering intent is sensed as a signal through a torque sensor directly connected to the steering wheel, and then the MDPS system receives the sensed signal from the sensor and controls an electric motor to provide an appropriate force to alleviate the drive's steering effort in view of a current speed of the vehicle, etc. The MDPS system provides a large force when the vehicle is being parked or running at a low speed, and provides a small force when the vehicle is running at a high speed to alleviate the driver's effort, so that stability of the vehicle body can be maintained.

The MDPS system may have a type in which the electric motor is mounted to an arm for connecting a steering gear box with a knuckle, or a type in which the electric motor is mounted to a steering column connected to the steering wheel. In any case, the principles in which the MDPS system determines a magnitude of a voltage which will be applied to the electric motor in view of an amount by which the steering wheel was rotated and a current speed of a vehicle when rotation of the steering wheel was sensed, apply the same basically.

By the way, a conventional MDPS system has the disadvantages in that mechanical friction of an MDPS assembly may be decreased due to the aging progressed after the vehicle was released initially, and thus a steering feeling that a driver feels after the aging was progressed may be different from a steering feeling that the driver feels when the vehicle was released initially.

Figure 1:
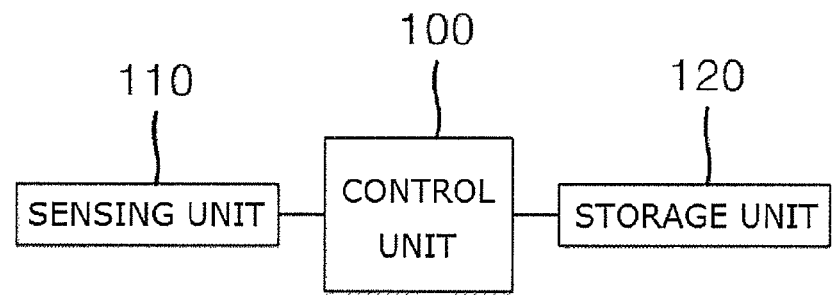
FIG. 1 shows a block configuration diagram illustrating a device for compensating friction of a motor driven power steering system according to an embodiment of the present invention.

FIG. 1 shows a block configuration diagram illustrating a device for compensating friction of a motor driven power steering system according to an embodiment of the present invention, and FIG.

2 is a graph showing a hysteresis curve based on a steering angle and a steering torque in the device for compensating friction of the motor driven power steering system according to an embodiment of the present invention.

As shown in FIG. 1, the device for compensating friction of the motor driven power steering system according to an embodiment of the present invention includes a control unit 100, a sensing unit 110, and a storage unit 120.

The sensing unit 110 may sense at least one of a steering angle, an angular speed and a vehicle speed, and a steering torque corresponding to at least one of the steering angle, the angular speed and the vehicle speed. For example, when the steering angle is 0.2 rad, the angular speed is 0.3 rad/s, and the vehicle speed is 70 km/h, the steering torque corresponding to this condition may be sensed as 10 N·m.

The steering angle refers to an angle amount that a steering wheel is steered by a driver, and the angular speed refers to a rotational speed of the steering wheel. In general, when the steering wheel is rotated in a clockwise direction, a value of the steering angle is represented as a positive value, whereas when the steering wheel is rotated in a counterclockwise direction, a value of the steering angle is represented as a negative value. The sensing unit 110 may measure the steering angle or the angular speed using an optical sensor. For example, the sensing unit may measure the steering angle or the rotational speed of the steering wheel by installing a light receiving unit on a torsion bar to be rotated along with the steering wheel and installing a light emitting unit on a fixed place. But, it should be noted that the present invention is not limited to this specific embodiment, but any other methods for measuring the steering angle or the angular speed known in the art may be used. The steering torque refers to a torque of the steering column and may be sensed by a column torque sensor (not shown).

And, one or more of the sensing units 110 may be present as necessary, and the sensing unit 110 may measure periodically or aperiodically at least one of the steering angle, the angular speed and the vehicle speed, and the steering torque corresponding to this, under the control of the control unit 100. Optionally, the control unit 100 may control the sensing unit 110 so that the sensing unit 110 can measure at least one of the steering angle, the angular speed and the vehicle speed, and the steering torque corresponding to this, only when required.

The storage unit 120 may store the steering torques sensed through the sensing unit 110 under the control of the control unit 100. To this end, the storage unit may include any other storage mediums capable of storing information such as an Electrically Erasable Programmable Read-Only Memory (EEPROM), a Flash memory, etc.

The control unit may store the steering torques sensed through the sensing unit 110 in the storage unit 120 when at least one of the steering angle, angular speed and vehicle speed sensed through the sensing unit 110 falls into their respective setting range. That is, a plurality of setting ranges in which the steering torques are to be stored may be present for the steering angle, the angular speed and the vehicle speed, respectively.

For example, if a setting range of the steering angle is set to 0.001~0.02 rad, a setting range of the angular speed is set to 0.1~0.3 rad/s, and a setting range of the vehicle speed is set to 70 km/h~80 km/h, when the sensing unit 110 senses a steering angle of 0.01 rad, an angular speed of 0.2 rad/s, a vehicle speed of 70 km/h, and a steering torque of 9 N·m, the control unit 100 may store the steering torque of 9 N·m in the storage unit 120. But if the sensing unit 110 senses a steering angle of 0.01 rad, an angular speed of 1.11 rad/s, a vehicle speed of 70 km/h, and a steering torque of 19 N·m, the control unit 100 may not store the steering torque of 19 N·m in the storage unit 120.

And, one or more of the setting ranges may be present for at least one of the steering angle, the angular speed and the vehicle speed respectively. For example, one set in which a setting range of the steering angle is 0~0.02 rad, a setting range of the angular speed is 0.1~0.3 rad/s, and a setting range of the vehicle speed is 70 km/h~80 km/h may be present concurrently along with another set in which a setting range of the steering angle is −0.02~−0.001 rad, a setting range of the angular speed is 0.1~0.3 rad/s, and a setting range of the vehicle speed is 70 km/h~80 km/h.

In this case, the control unit 100 may store the steering torques corresponding to at least one of the steering angle, the angular speed and the vehicle speed which falls into the setting ranges of each set, respectively, in the storage unit 120, and the storage unit 120 may be divided into a plurality of spaces for storing the steering torques by each set.

In the following, the term "setting range set" refers to one that form a set of a setting range of the steering angle, a setting range of the angular speed and a setting range of the vehicle speed to be fallen into at the same time so as to store the steering torques by the control unit 100.

The setting range set may be designed to maintain a width of the initial on-center hysteresis, and alternatively to provide any other criteria for maintaining the steering feelings when the vehicle was released initially.

Moreover, since one or more of the setting range sets may be present, the control unit 100 may measure the steering torques under various conditions, and then perform a heuristic compensation of friction in view of the measured steering torques. Further, the control unit 100 may perform heuristic compensations of friction independently in clockwise and counterclockwise directions respectively by using different setting range sets so that clockwise and counterclockwise steering feelings may be maintained at an equivalent level.

Figure 2:
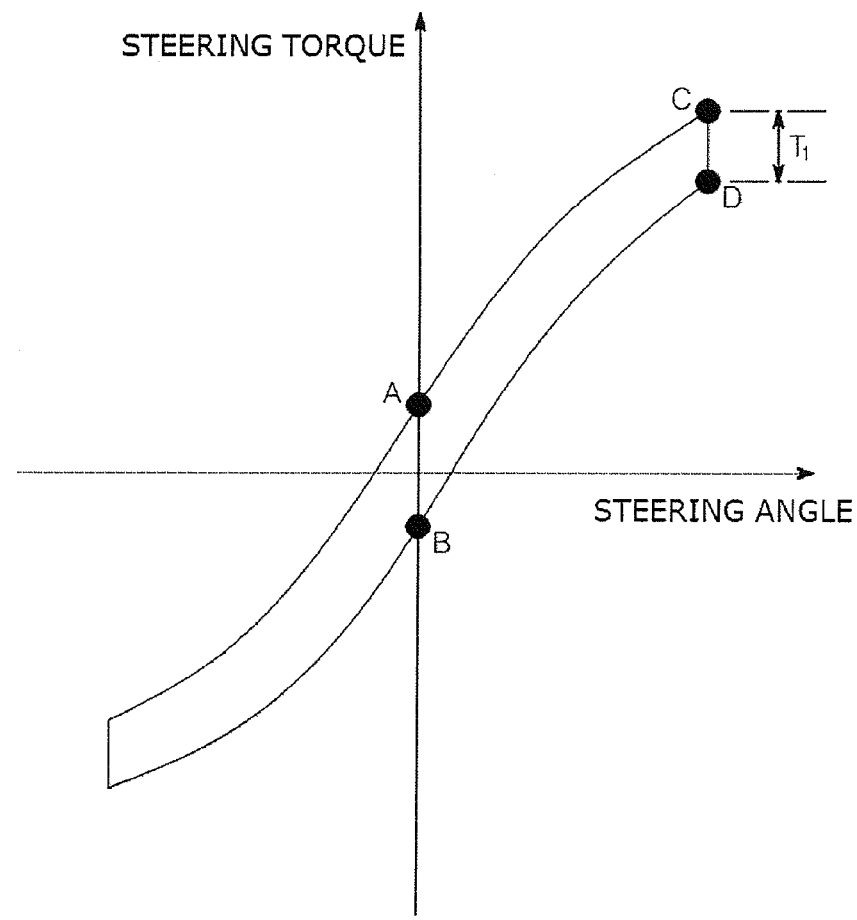
FIG. 2 is a graph showing a hysteresis curve based on a steering angle and a steering torque in the device for compensating friction of the motor driven power steering system according to an embodiment of the present invention.

Referring to FIG. 2 and discussing in more detail, the control unit 100 may perform heuristic compensation of friction by measuring friction (point A or B) at on-center or a width T1 of hysteresis upon reversing a steering wheel. Herein, the term "on-center" refers to a state that the steering wheel is on a neutral position.

The steering torque obtained through measurement in a point A represents a friction value at on-center when a driver rotates the steering wheel in a clockwise direction, and the steering torque obtained from measurement in a point B represents a friction value at on-center when the driver rotates the steering wheel in a counterclockwise direction. Herein the term "friction value" refers to a value representing quantitatively a magnitude of the degree that the steering wheel may not be smoothly rotated, despite a driver forcing to rotate the steering wheel in a clockwise direction.

Further, the width of the steering torque obtained by measuring a width T1 refers to a value representing quantitatively a magnitude of the degree that the steering wheel may not be smoothly rotated, despite a driver forcing to reverse the steering wheel in a counterclockwise direction.

The values of the steering torques to be measured upon measurement of the point A, the point B or the width T1 may depend on the angular speed and the vehicle speed. Thus, it is not possible to predict the change of friction until the criteria for the angular speed and the vehicle speed are decided and the steering torques for particular steering angles (e.g., a steering angle of point A) are measured repeatedly. That is, to predict the change of friction by measuring the change of friction on the A point, the B point, or the width T1, the setting range sets for the A point, the B point, and the width T1 may be required respectively.

Herein, the change of friction refers to a difference between the friction when a vehicle was released initially and the friction after the vehicle has been aged, and may be predicted from the average value of the steering torques.

Thus, the control unit 100 may calculate an average value of the stored steering torques when the number of steering torques stored in the storage unit 120 corresponding to any setting range set is equal to or higher than a reference number. The reference number is pre-set basically and represents to a numerical value sufficient to identify the change of friction, but the reference number may be set to any numerical values according to a design matter.

For example, when the reference number is M, and the number of steering torques stored in the storage unit 120 for point A is M ($T_{A1}, T_{A2}, \ldots, T_{AM}$), the control unit 100 may calculate the average value of the stored steering torques using the calculation such as Equation (1) as follows:

$$\text{average value} = \frac{T_{A1} + T_{A2} + \ldots + T_{AM}}{M} \quad (1)$$

Here, the control unit 100 may predict the change of friction based on a result obtained by comparing the average value of the steering torques with a reference value, and then calculate a friction-heuristically-compensating torque therefrom. The reference value is initially pre-set basically to an average value of steering torques when a vehicle was released initially, but the reference value may be set to a numerical value calculated in the same manner as a manner calculating an average value of the stored steering torques described above. Here, the reference number when calculating the reference value may be different from the reference number when calculating the average value of the stored steering torques.

For example, to predict the change of friction by measuring width T1 as shown in FIG. 2, the control unit 100 may calculate a change amount of width T1 by calculating a formula such as Equation 2 as follows:

$$\text{change amount of width } T1 = \frac{(C_M - C_S) - (D_M - D_S)}{(C_S - D_S)} \quad (2)$$

wherein, a subscript M refers to an average value of the steering torques stored in the storage unit 120, and a subscript S refers to the reference value. That is, $C_M$ refers to an average value of the steering torques stored in the storage unit 120 for a point C from which the steering wheel starts to be reversed by a driver, $C_S$ refers to a pre-set reference value for the point C, $D_M$ refers to an average value of the steering torques stored in the storage unit 120 for a point D from which the steering wheel starts to be moved normally after reversing, and $D_S$ refers to a pre-set reference value for the point D. Herein, the term "normally" refers to a state in which a driver can rotate smoothly the steering wheel. For example, when a change rate of steering angle to the steering torque after starting to reverse is equal to or higher than a setting value (e.g., 0.2), it can be said that the steering wheel starts to be moved normally. Here, the setting value may be set to any other values in view of the conditions of the vehicle.

Furthermore, when predicting a change of friction on a point A, the control unit 100 may calculate the change amount of friction on the point A by using the calculation such as Equation 3 as follows:

$$\text{change rate of friction for point } A = \frac{A_M - A_S}{A_S} \quad (3)$$

wherein, $A_M$ refers to an average value of the steering torques stored in the storage unit 120 for a point A from which a driver rotates the steering wheel from on-center in a clockwise direction, and $A_S$ refers to a pre-set reference value for the point A.

The control unit 100 may calculate a friction-heuristically-compensating torque by multiplying the above-mentioned change amount by a friction-heuristically-compensating constant value. That is, the friction-heuristically-compensating torque corresponds to a value for compensating a torque, not based on the friction itself, but based on the change of friction.

The constant value may be not a fixed value, and thus the control unit 100 may determine the constant value by referring to a friction-basically-compensating torque. Here, the friction-basically-compensating torque corresponds to a value for compensating torque depending on a mechanical friction itself inherent in MDPS system. The friction-basically-compensating torque may be predetermined in view of the torque from a user's input, a steering direction, a steering position, etc., before calculating the friction-heuristically-compensating torque.

Thus, the friction-heuristically-compensating torque for a point A may be obtained by calculating a formula such as Equation 4 as follows:

$$\text{friction-heuristally-compensating torque for Point } A = \frac{A_M - A_S}{A_S} \times K \quad (4)$$

wherein, K corresponds to a constant value.

The control unit 100 may compute a friction-compensating torque by adding the friction-heuristically-compensating torque to the friction-basically-compensating torque. That is, the torque compensating value based on the friction may be determined by adding the friction-heuristically-compensating torque calculated by predicting the change of friction, to the predetermined friction-basically-compensating torque.

While it has been described with respect to the embodiments in which the control unit 100 may calculate the friction-heuristically-compensating torque in view of the steering angle, the angular speed and the vehicle speed, it should be appreciated by a person skilled in the art that the control unit 100 may designed to calculate the friction-heuristically-compensating torque in view of only one or some of the steering angle, the angular speed and the vehicle speed.

Figure 3:
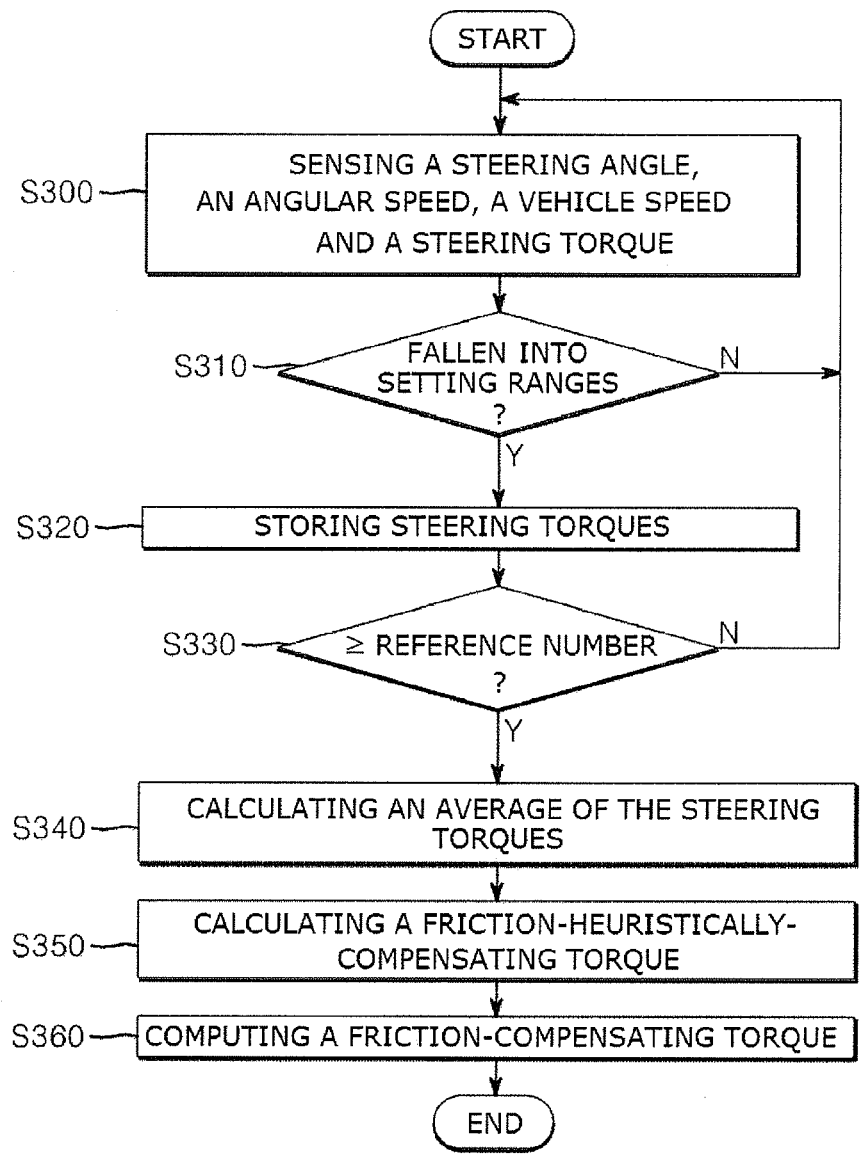
FIG. 3 is a flowchart illustrating a method for compensating friction of the motor driven power steering system according to an embodiment of the present invention.

FIG. 3 is a flowchart illustrating a method for compensating friction of a motor driven power steering system according to an embodiment of the present invention.

As shown in FIG. 3, the control unit 100 may sense at least one of the steering angle, the angular speed and the vehicle speed, and the steering torque corresponding to the at least one of the steering angle, the angular speed and the vehicle speed, through the sensing unit 110 (S300).

Then, the control unit 100 may determine whether the at least one of the steering angle, the angular speed and the vehicle speed sensed in step S300 falls into the respective setting range (S310).

If it is determined in step S310 that the at least one of the steering angle, the angular speed and the vehicle speed falls into the respective setting range, then the control unit 100 may store the steering torques sensed in step 300 into the storage unit 120 (step S320). Otherwise, if it is determined in step S310 that the at least one of the steering angle, the angular speed and the vehicle speed does not fall into any one of the their setting ranges, the control unit 100 returns to step S300 to repeat the above mentions steps including the step of sensing.

On the one hand, after step S320, the control unit 100 may determine whether the number of steering torques stored in the storage unit 120 is equal to or higher than the reference number (S330).

If it is determined in step S330 that the number of steering torques stored in the storage unit 120 is equal to or higher than the reference number, then the control unit 100 may calculate the average value of the steering torques stored in the storage unit 120 (S340). Otherwise, when the number of steering torques stored in the storage unit 120 is less than the reference number in step S330, the control unit 100 returns to step S300 to repeat the above-mentioned steps including the step of sensing.

On the other hand, after step S340, the control unit 100 may calculate the friction-heuristically-compensating torque based on the result obtained by comparing the reference value with the average value of the steering torques calculated in step S340 (S350).

Then, the control unit 100 may compute the friction-compensating torque by adding the friction-heuristically-compensating torque calculated in step S350, to the predetermined friction-basically-compensating torque (S360).

As mentioned above, the device and method for compensating friction of the motor driven power steering system according to an embodiment of the present invention can provide a driver with a level of steering feelings equivalent to that of a vehicle that was released initially, by predicting continuously the mechanical friction of the MDPS assembly and then computing the friction-compensating torque therefrom, even though the mechanical friction of the MDPS assembly has been decreased. Furthermore, the driver can feel the steering feelings in a clockwise direction equivalent to the steering feelings in a counterclockwise direction, by compensating the change of friction upon steering in a right or left direction.

While the present invention have been described with reference to embodiments shown in the drawings, the present invention is described only for illustration and are not limited to the specific embodiments described herein. It will be thus appreciated by the skilled person in the art that various variants or modifications may be made without departing from the scope and spirit of the invention. Therefore, the scope of the present invention should be defined only in accordance with the following claims and their equivalents.

What is claimed is:

1. A device for compensating friction of a motor driven power steering system, comprising:
    at least one sensor configured to sense at least one of a steering angle, an angular speed and a vehicle speed, and a steering torque corresponding to at least one of the steering angle, the angular speed and the vehicle speed;
    a data storage configured to store the steering torques sensed by the at least one sensor; and
    a controller configured to cause the data storage to store the steering torques sensed from the at least one sensor when the at least one of the steering angle, the angular speed and the vehicle speed is within a respective setting range,
    wherein the controller is configured to calculate an average value of the stored steering torques when the number of steering torques stored in the data storage is equal to or higher than a reference number, and the controller is further configured to compute a friction-compensating torque based on a result obtained by comparing the average value with a reference value,
    wherein when computing the friction-compensating torque, the controller is configured to calculate a friction-heuristically-compensating torque based on the result obtained by comparing the average value with the reference value and further configured to add the heuristically-compensating torque to a predetermined friction-basically-compensating torque.

2. The device of claim 1, wherein the friction-heuristically-compensating torque corresponds to $$\frac{\text{average value} - \text{reference value}}{\text{reference value}} \times \text{constant value},$$

and the controller is configured to determine the constant value by referring to the friction-basically-compensating torque.

3. The device of claim 1, wherein the controller is configured to cause to the data storage to store at least one of a steering torque when a driver rotates a steering wheel from on-center in a clockwise direction and a steering torque when the driver rotates the steering wheel from on-center in a counterclockwise direction.

4. The device of claim 1, wherein the controller is configured to cause to the data storage to store at least one of a steering torque when a steering wheel starts to be reversed by a driver and a steering torque when the steering wheel starts to be moved normally after reversing.

5. The device of claim 1, wherein the controller is configured to cause to the data storage to store the steering torques sensed from the at least one sensor when each of the steering angle, the angular speed and the vehicle speed is within the respective setting range,
    wherein the data storage comprises a plurality of sets of setting ranges and the respective setting range is one of the sets of the setting ranges.

6. A method of operating motor driven power steering system, the method comprising:
    sensing at least one of a steering angle, an angular speed and a vehicle speed, and a steering torque corresponding to the at least one of the steering angle, the angular speed and the vehicle speed;
    storing in a data storage the steering torques when the at least one of the steering angle, the angular speed and the vehicle speed sensed is within a respective setting range;
    calculating an average value of the stored steering torques when the number of steering torques stored in the data storage is equal to or higher than a reference number; and
    computing the friction-compensating torque based on a result obtained by comparing the calculated average value and a reference value,
    wherein computing the friction-compensating torque comprises:
        calculating a friction-heuristically-compensating torque based on the result obtained by comparing the calculated average value and the reference value; and
        adding the calculated heuristically-compensating torque to a predetermined friction-basically-compensating torque.

7. The method of claim 6, wherein calculating the friction-heuristically-compensating torque comprises:
    determining a friction-heuristically-compensating constant value by referring to the friction-basically-compensating torque,
    wherein the friction-heuristically-compensating torque corresponds to $$\frac{\text{average value} - \text{reference value}}{\text{reference value}} \times \text{the constant value}.$$

8. The method of claim 6, wherein a steering torque is stored when a driver rotates a steering wheel from on-center in a clockwise direction and a steering torque is also stored when the driver rotates the steering wheel from on-center in a counterclockwise direction.

9. The method of claim 6, wherein a steering torque is stored when a steering wheel starts to be reversed by a driver and a steering torque is also stored when the steering wheel starts to be normally moved after starting to reverse.

10. The method of claim 6, wherein the sensed steering torques is stored when each of the steering angle, the angular speed and the vehicle speed is within the respective setting range defined in any set of a plurality of the setting range sets,
   wherein the data storage comprises a plurality of sets of setting ranges wherein the respective setting range is one of the sets of the setting ranges.

* * * * *